United States Patent

[11] 3,586,422

| [72] | Inventors | Kenichi Kagami<br>Tokyo;<br>Makoto Yamashita, Kanagawa; Masagoro Kushida, Yokohama-shi, all of, Japan |
|---|---|---|
| [21] | Appl. No. | 798,290 |
| [22] | Filed | Feb. 11, 1969 |
| [45] | Patented | June 22, 1971 |
| [73] | Assignee | Ichiko Kogyo Kabushiki Kaisha<br>Tokyo, Japan |
| [32] | Priority | Oct. 18, 1968 |
| [33] | | Japan |
| [31] | | 43/90496 |

[54] ADJUSTABLE REAR VIEW MIRROR
6 Claims, 8 Drawing Figs.

[52] U.S. Cl. .................................................. 350/281
[51] Int. Cl. ............................................... G02b 5/08, G02b 7/18
[50] Field of Search ........................................ 350/279–281

[56] References Cited
UNITED STATES PATENTS

| 3,004,473 | 10/1961 | Arthur et al. ................ | 350/281 |
| 3,507,562 | 4/1970 | Yamashita et al. ............ | 350/281 |

*Primary Examiner* — John K. Corbin
*Attorney* — Cushman, Darby & Cushman

ABSTRACT: An easily fabricated, substantially vibration-free inside mirror assembly permitting the user to positively and easily change selectively the two reflecting positions thereof is obtained by the arrangement: a mirror having two intersecting front and rear reflection surfaces with low and high reflection factors, respectively, and being secured to the open front side of a mirror casing molded with a synthetic resin, and a mirror angle regulating polygonal plate fixed around a mirror angle shifting rod and extending through the bottom wall of said casing and engagingly inserted, at its top, in the bottom slot of an attachment fitting pivotably supported in the mirror casing, said plate being resiliently nipped by a pair of stoppers formed in the mirror casing integrally therewith.

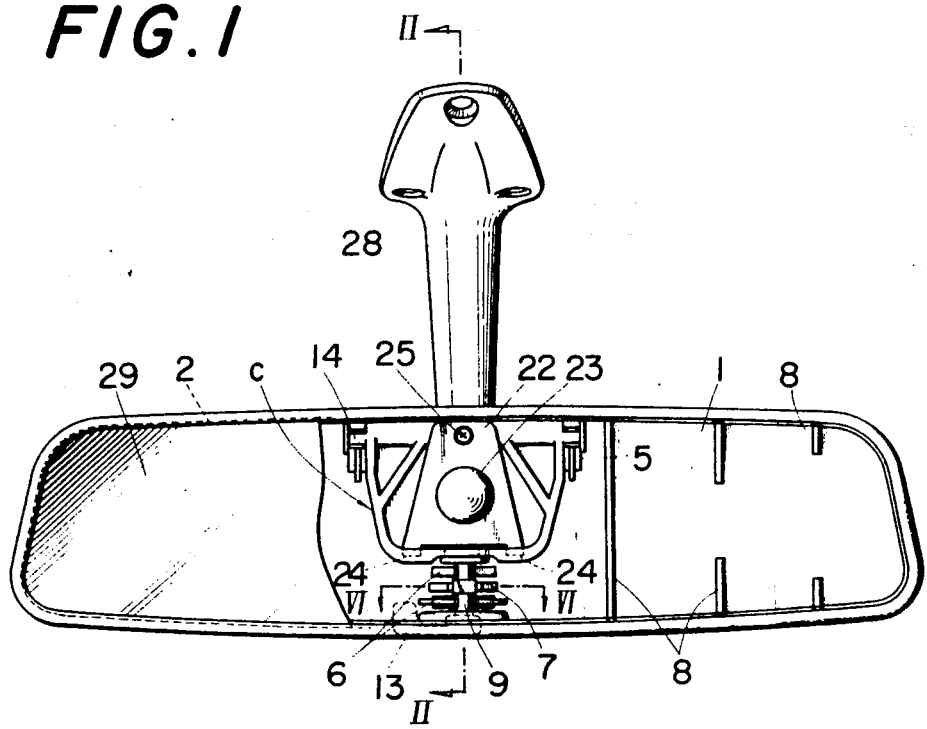
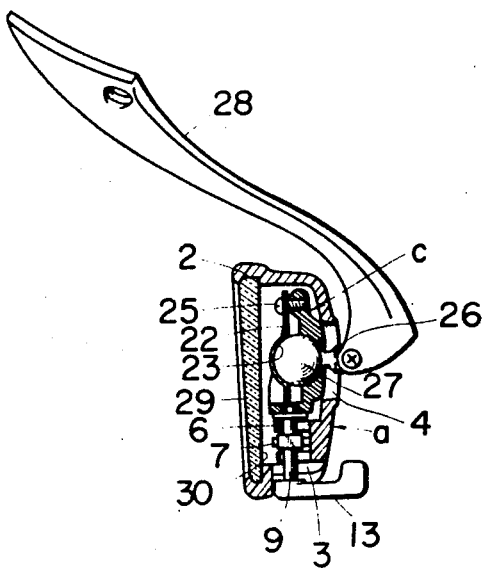
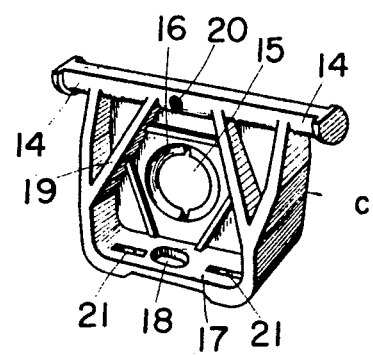

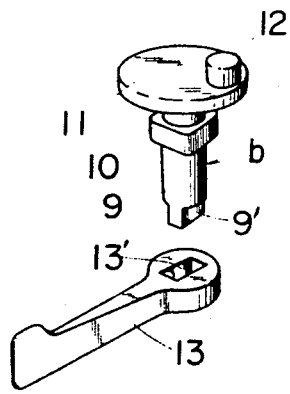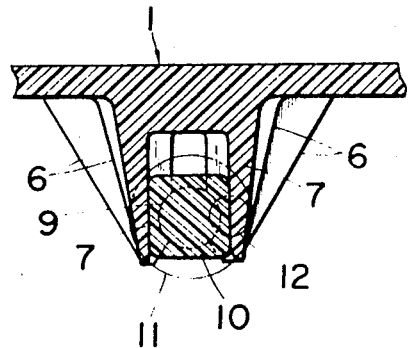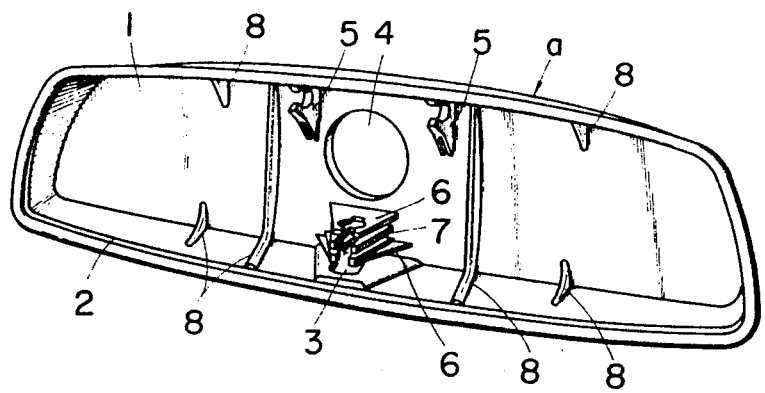

ADJUSTABLE REAR VIEW MIRROR

BACKGROUND OF THE INVENTION

1. Field of the Invention

The present invention is concerned with inside mirrors for use in automobiles and other vehicles, and more particularly, it relates to an inside mirror assembly of the type which permits the driver to make two-way shifting of the reflection factors, i.e. from a low reflection factor to a high reflection factor and vice versa, of the mirror housed securely in the mirror casing which is disposed in the driver's chamber in the automobile so as to face the driver's eyes.

2. Description of the Prior Art

An inside mirror of the aforesaid type which permits the driver to make two-way shifting of the reflection factors of the mirror faces is known from the descriptions made in literature such as U.S. Pat. No. 3,029,701. These inside mirrors of the prior art which, as stated above, permit the drivers to make two-way shifting of the reflection factors of the mirrors, however, have the drawbacks and inconveniences that they require a large number of parts for their fabrication and that they are of complicated structures and that, accordingly, they are not suitable from the aspect of efficiency and economy which are required in mass production.

SUMMARY OF THE INVENTION

It is, therefore, the primary object of the present invention to eliminate the forgoing drawbacks and inconveniences of the inside mirrors of the prior art and to provide an inside mirror assembly of the type described but which permits the driver to make two-way shifting of the reflection factors of the mirror with better efficiency and accuracy and which is manufactured easily and efficiently by fabricating it only by the insertion or mounting of a minimized number of parts which are prepared by relying on the technique of integral molding of a synthetic resin.

Another object of the present invention is to provide an inside mirror assembly of the type described, which id formed to absorb substantially all of the vibrations caused in said assembly and which, therefore, is free of the inconvenience arising from the distortion of the images to an unidentifiable extent due to the vibrations of the mirror assembly caused by the engine in motion or by some other reasons.

Still another object of the present invention is to provide an inside mirror assembly of the type described, which is highly safe in emergencies in such a way that, when a part of the body of the driver or the passenger bumps against the mirror as the body of the driver or the passenger is forced to bend forwardly by the reaction which is resulted from the sudden and abrupt halt of the vehicle or for any other reason, the driver or the passenger will be substantially kept from sustaining an injury.

Yet a further object of the present invention is to provide an inside mirror assembly of the type described, which enables the driver to positively and easily effect the shifting of the vertical angle of the mirror to obtain a different reflection factor relative to that obtained prior to the shifting, by a simple manual operation of rotating the reflection factor shifting rod which is performed by a mere turning of the lever attached to said rod.

A still further object of the present invention is to provide an inside mirror assembly of the type described which, even when the reflection factor shifting rod is turned through an insufficient angle by the driver will automatically adjust, by itself, the angle of turn of said rod to thereby enable the driver to effect the perfect shifting of the reflection factor of the mirror to obtain the desired correct one.

BRIEF DESCRIPTION OF THE DRAWING

The drawing represents a couple of preferred embodiments, by way of example, of the inside mirror assembly of the present invention, in which FIG. 1 is a front view, partly cut away, of the inside mirror assembly representing one embodiment of the invention;

FIG. 2 is a sectional view taken along the line II-II in FIG. 1;

FIG. 3 is a perspective view of the attachment fitting;

FIG. 4 is a perspective view, partly in the form of separated elements, of the reflection factor shifting rod and the lever for operating said shaft;

FIG. 5 is a perspective view of the mirror casing;

FIG. 6 is a sectional view taken along the line VI-VI in FIG. 1;

FIGS. 7 and 8 represent another embodiment of the mirror assembly of the present invention, wherein FIG. 7 is a longitudinal sectional view taken on one side of the mirror assembly with the new stay attachment means, and FIG. 8 is a perspective view, with parts broken away and arranged in separated form, showing the structure of the new attachment device for the stay.

DESCRIPTION OF THE PREFERRED EMBODIMENTS

Figure 7:
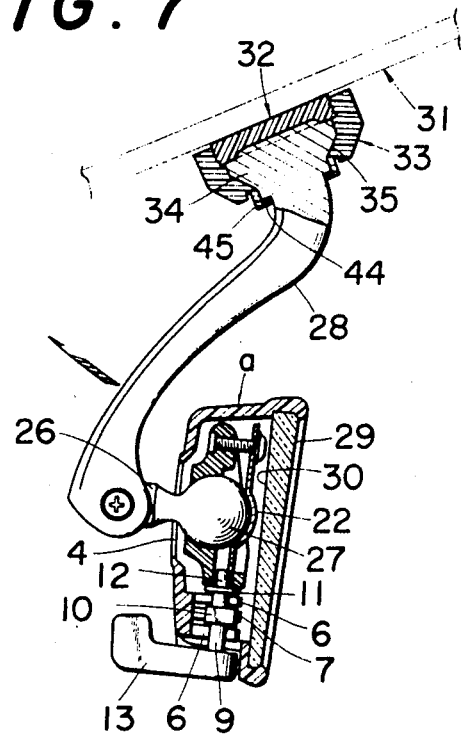

Referring now to FIGS. 1 through 6 which represent one aspect of the present invention, the letter $a$ generally represents a mirror casing which is produced by molding a synthetic resin. This mirror casing has an open front side. Reference numeral 2 represents a groove for securely fitting a mirror therein, said groove being formed on the inside of the peripheral edges defined by the sidewalls, the top wall and the bottom wall of the mirror casing. Numeral 3 represents a through-hole provided in a recess having a concave configuration bulging inside the casing and being formed in the central portion of the bottom wall of the mirror casing to permit the insertion therethrough of a reflection factor shifting rod which will be described later, as will be viewed best in FIG. 2. Said recess is provided there to contain the lower end of said shifting rod and also a lever intended for operating lever and attached to said end of the shifting rod in such a way that they will not protrude outwardly beyond the lower external peripheral edge line on the front side of said mirror casing. Numeral 4 represents an aperture formed in the vertical rear wall of the mirror casing and serving as the aperture for permitting the insertion of a stem intended for supporting an articulated spherical member. Numeral 5 represents a pair of spaced bearings which extend toward the front side of the mirror casing from a relatively upper portion of the inside face of the vertical rear wall of the mirror casing and which are formed integrally with said mirror casing. Numerals 6 and 6 represent a pair of horizontally spaced holding arms extending toward the front side of the mirror casing from a lower portion of the inside face of said rear wall of the mirror casing and which are also formed integrally with said mirror casing. Another pair of horizontally spaced holding arms 6 and 6 extend in much the same way from the same rear wall, but they are located above said first pair of holding arms. Thus, there are provided two pairs of holding arms spaced vertically relative to each other. These two pairs of holding arms are intended for rotatably holding or nipping a reflecting factor shifting rod which will be described later. Numeral 7 represents a pair of horizontally spaced stoppers which extend toward the front side of the mirror in like manner from the rear wall of the mirror casing. This pair of stoppers are located intermediate of the aforesaid two pairs of holding arms and these stoppers are again formed integrally with the mirror casing. This pair of stoppers in intended to resiliently nip and retain a mirror angle regulating and retaining plate therebetween, said plate being fixed or integrally formed around the external circumference of the reflection factor shifting rod as will be described later. Numeral 8 generally represents a group of ribs formed on the inner faces of the walls of the mirror casing integrally therewith. These ribs are intended for serving as the reinforcing members of the mirror casing. As has been stated, all of these parts are molded integrally with the mirror casing by the use of a synthetic resin.

The letter *b* represents generally a reflection factor shifting rod, the stem 9 of which is inserted downwardly through said through-hole 3 of the mirror casing from the inside thereof. This stem 9 of the rod *b* is rotatably nipped and held by the aforesaid two pairs of holding arms 6 and 6. Numeral 10 represents a mirror angle regulating and retaining plate which, in this example, if formed around the external circumference of the upper portion of the reflection factor shifting rod *b*. This plate 10 may either square in shape as illustrated or it may be provided in any other polygonal shape. Any opposing two side edges of this square or polygonal plate 10 are arranged so as to be parallel to each other, and furthermore, the distance between any opposing two side edges is arranged so as to be substantially equal to the gap between the inner faces of the aforesaid stoppers 7 and 7 which from a pair. Numeral 11 represents a disc fixed to the top of the portion of the stem 9 on the side extending beyond the upper face of said mirror angle regulating and retaining plate 10. Numeral 12 represents a projection extending upwardly, at an eccentric site, from the upper face of said disc 11. It should be understood that this reflection factor shifting rod *b* may be formed either with a metal or molded with a synthetic resin. Numeral 13 represents a lever which is attached to the lower end of the reflection factor shifting rod *b*. This lever 13 is provided, in one end portion remote from the portion which is operated by the driver's fingers, with a square or rectangular slot 13' through which is inserted the lower end portion 9' of the 9, said portion 9' having a square or rectangular cross section and configuration corresponding to that of said slot 13', so that, by turning the lever 13, the stem 9, and accordingly the rod *b*, is rotated as desired.

The letter *c* represents generally an attachment fitting which is a molded article of a synthetic resin. This attachment fitting *c* is provided with a pair of shafts 14 and 14 which extend horizontally in opposite directions and outwardly beyond the outer surfaces of the vertically extending sidewalls of the fitting *c*. Said attachment fitting *c* is provided, substantially centrally of its rear vertical wall, with an opening 15 for the insertion of the base stem of a spherical member therethrough and also with an annular seat formed adjacent to the edge of said opening and 16 having a concave inner face which conforms to the arcuate-profiled portion of the spherical member 27 so that said portion of the latter member may be snugly received on said seat 16. The attachment fitting *c* is provided, in the bottom wall 17 thereof, with an oblong slot 18 for the insertion therethrough of the aforesaid projection 12 of the rod *b*. The attachment fitting *c* is further provided, at appropriate sites thereof, with a plurality of reinforcement ribs which are generally indicated by numeral 19 and also with a small threaded hole 20 for the insertion of a fastening screw which is to be screwed therein. Said threaded hole 20, in this example, is provided in the middle of the inner side of the intermediate portion of a top horizontal shaft which is, actually, extensions of said shafts 14 and 14. Said attachment fitting *c* is provided also with recesses 21 and 21 which are formed in the bottom wall of said fitting to receive the projecting, spaced lower end edges or lugs 24 and 24 of a leaf spring member which will be described later. These ribs and other elements described above of the attachment fitting *c* are formed by being molded integrally with the body of the attachment fitting by the use of a synthetic resin.

Numeral 22 represents a leaf spring having a substantially triangular shape and being intended for supporting and receiving the articulate spherical member and further for nipping the articulate spherical member with the cooperation of the attachment fitting *c*. This leaf spring 22 is provided, in substantially the central portion, with a concave recess 23 for snugly and frictionally accommodating the articulate spherical member, and also provided, at the lower end, with two downwardly projecting lugs 24 and 24 which extend downwardly from said lower end so as to be inserted in the recesses 21 and 21 of the bottom wall 17 of the attachment fitting. This leaf spring 22 is secured to the attachment fitting *c* by a screw 25 which is screwed, from above and through said leaf spring, into the threaded hole 20 which is formed in the middle of the top portion of the attachment fitting *c* as described above.

Numeral 26 represents a stem for supporting the articulate spherical member 27 which is provided at the foremost end of said stem 26. Numeral 28 represents a stay, to the foremost end of which is rotatably attached the aforesaid stem 26 which is intended for supporting the spherical member.

The mirror 29 is comprised of a glass plate or a plate made of a synthetic resin having a high degree of transparency. As will be noted from the example shown in FIG. 2, the mirror 29 is of a somewhat triangular cross section, and has two reflection faces, one of which is formed on the rear side and represents a face 30 having a high reflection factor. This face 30 is that of a layer produced by relying on the vacuum deposition of aluminum or by any other appropriate technique, said layer being applied to the rear side of the mirror. The other of the reflection faces is present on the front side of the mirror, and this face represents a face having a low reflection factor. This reflection face having a low reflection factor is that of the glass plate or that of the plate made of a synthetic resin.

The inside mirror assembly incorporating the present invention is fabricated in the following manner. To begin with, the projection 12 which extends upwardly from an eccentric site of the top face of the disc 11 of the reflection factor shifting rod *b* is inserted into the oblong slot 18 formed in the bottom wall 17 of the attachment fitting *c*. The attachment fitting *c* having this projection 12 inserted therein as stated above is, in turn, placed inside the mirror casing *a*. Thereafter, the stem 26 for supporting the articulate spherical member 27 and having this spherical member 27 at its foremost end is inserted into the opening 15 of the attachment fitting *c* from the front side thereof, which is already placed and supported in the mirror casing *a*, and further through the aperture 4 which is formed in the rear wall of the mirror casing *a*. Then, a leaf spring 22 is superposed onto the front side of the spherical member 27, concurrently facing the front side of the attachment fitting *c*. Along with this, the projecting lugs 24 and 24 of the leaf spring 22 are inserted in the recesses 21 and 21 of the attachment fitting *c*, respectively, while, on the other hand, a screw 25 is applied to the top portion of the leaf spring 22 so that this screw is screwed through this leaf spring into the threaded hole 20 formed in the top horizontal shaft of the attachment fitting to fasten this leaf spring thereto. As a consequence, the articulate spherical member 27 is supported and nipped between the seat 16 of the attachment fitting *c* and the concave recess 23 of the leaf spring 22. Thereafter, the shafts 14 and 14 of the attachment fitting *c* are applied to the bearings 5 and 5 which are provided on the inner face of the rear wall of the mirror casing *a* so that these shafts 14 and 14 are supported thereby. Along with this, the stem 9 of the reflection factor shifting rod *b* is forced in the gap between the two holding arms 6 and 6 and also between the other pair of holding arms 6 and 6 formed in the mirror casing so that the stem 9 is nipped and held rotatably by these two pairs of holding arms. The mirror angle regulating and retaining plate 10 is then forcibly inserted between the two stoppers 7 and 7. Along with this, the lower end portion of the stem of the reflection factor shifting rod is introduced into the through-hole 3 formed in the central recessed portion of the bottom wall of the mirror casing *a*, and the lever 13 is then attached to the lowermost end of said stem 9 of the shifting rod *b*. Lastly, the mirror 29 is fitted in the recessed groove 2 which if formed along the inside of the peripheral edges of the mirror casing which define the open front thereof, and with this, the fabrication of the inside mirror assembly is completed.

It should be understood that said mirror casing *a* and its parts, i.e. the holding arms 6 and 6 intended for holding the reflection factor shifting rod and the stoppers 7 and 7 all of which being integrally molded with said mirror casing, are made of a synthetic resin, and accordingly, these parts of the mirror casing are of resiliency. This resiliency of the aforesaid respective elements serves to facilitate the fabrication of the mirror assembly since they can be resiliently deformed or opened apart sufficiently to receive the reflection factor shifting rod and the mirror when they are introduced in or attached to the right places of the mirror casing. Besides, these parts which are molded with a synthetic resin have the property to restore their initial shapes from their distorted or deformed shapes upon completion of the fabrication of the inside mirror assembly, and thus, the reflection factor shifting rod as well as the mirror are positively held by these parts of the mirror casing.

The inside mirror assembly which is fabricated in the foregoing manner is operable in such a way that, upon turning the lever 13 through the angle of 90°, the position of the projection 12 of the reflection factor shifting rod is rendered either closer to the mirror 29 or away from said mirror for a predetermined distance, with the result that the mirror casing in which the reflection factor shifting rod 9 is nipped by the holding arms is caused to tilt precisely through the predetermined angle about a horizontal axis to change the vertical angle or the elevation of the mirror, so that the driver can obtain, without fail, the desired reflection from one reflection face selected from the two faces of the mirror, i.e. the face having the low reflection factor which represents the front face of the mirror and the face 30 having the high reflection factor which represents the rear face of the mirror. According to the present invention, the aforesaid stoppers 7 and 7 are made of a synthetic resin and they have inherent resiliency. Therefore, there is no need for the employment of any spring means to provide the stoppers with the nipping spring action which is required after the stoppers are diverged of the gap between them as the mirror angle regulating polygonal plate which is intended to hold the correct angle of the mirror is turned in said gap between the two stoppers via the aforesaid shifting rod which is operated manually by the driver. As the aforesaid mirror angle regulating and retaining plate is turned, the stoppers will be resiliently diverged to broaden the gap therebetween by the engagement of the stoppers with the opposite corners of the plate, at which portion of the plate the transverse dimension thereof is maximum. However, the diverged stoppers then tend to restore their initial converged positions and, owing to the force of the stoppers to return to their initial positions, the diagonal corners of the plate will be urged to turn in the same rotating direction as that in which the plate was turned, via the shifting rod, by the dirver's fingers. As a consequence, the stoppers will again nip the opposing two parallel sides of the mirror angle regulating and retaining plate 10 upon the cease of the turning of the latter by the arms of the stoppers. As a result, the mirror casing is held at an angle of either elevation of depression which has been selected by the driver. It should be noted, however, that, when it is intended to rotate the reflection factor shifting rod, this rod b and accordingly the mirror angle regulating and retaining plate 10 need not be rotated precisely through 90°. The force of the arms of the stoppers 7 and 7 to restore their resilience will always act on the corners of the mirror angle regulating and retaining plate 10 in such a direction as will urge the completion of the unfinished turn of the plate by forcing it to turn until the opposite parallel sides of the plate are held and nipped by the two arms of the stoppers in which position the plate rests in its correct angle. Thus, the plate 10 will not be held in a halfway position arising from unfinished turn. As a result, the shifting of the reflection factor of the mirror is quite easily and precisely accomplished.

Since the inside mirror assembly incorporating the present invention is such that the mirror casing as a whole is made by molding a synthetic resin as stated above, the inside mirror assembly per se is of the property to satisfactorily absorb vibrations which are transmitted thereto from the engine, in motion, of the automobile or from other sources. Thus, the inside mirror assembly which is obtained according to the present invention is of the property to be substantially free of vibrations, and thus, there will occur no undesirable vibrations of the images on the mirror faces which were encountered often with the inside mirrors of the prior art. Though the inside mirror of the present invention is of the reflection factor shifting type as has been described in the introductory part of this specification, it is of a satisfactory durability as well as a desirable vibration-free property and also it can be operated smoothly because of the arrangement: that the mirror 29 is securely fitted to the mirror casing; that the mirror casing as a whole is adapted to change its angle of elevation and depression as the casing as a whole is tilted about the horizontal shafts 14 and 14 of the attachment fitting c; and that the mirror casing is supported by said horizontal shafts 14 and 14 and also by the holding arms 6 and 6 for holding the reflection factor shifting rod b.

According to the present invention, the bearings 5, the holding arms 6 and 6 for holding the reflection factor shifting rod, the stoppers 7 and 7 and ribs and other parts of the mirror casing are molded integrally with the mirror casing, and there is substantially employed no metal member. For this reason, it is possible to greatly save and minimize the number of parts, and in addition, the fabrication of the mirror assembly requires only the procedure of mounting or inserting the aforesaid other members in the mirror casing, and thus, the efficiency in the fabrication of the mirror assembly is improved to a great extent.

Description has been directed heretofore in this specification to the arrangement of the inside mirror assembly of the type where the stay 28 is fixed to the appropriate side inside the driver's chamber of the vehicle. However, it is also possible to make the inside mirror assembly of the present invention into one which is of a highly increased safety by arranging it in such a way as will spontaneously come off at the base thereof when the mirror is subjected to a substantial amount of impact, say, the head portion of the driver or the passenger at the time of abrupt halt of the vehicle, and this arrangement is shown in FIGS. 7 and 8.

Figure 8:
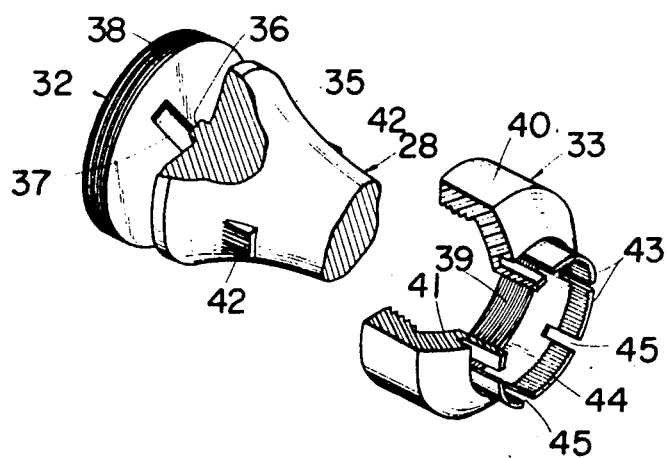

The example shown in FIGS. 7 and 8 is of the arrangement such that there is adherently firmly attached a platform member 32 to the front glass pane 31 of an automobile, and that the base of the stay 28 which supports the mirror casing a is applied to said platform member 32, and further that these two are engagingly mounted by a cap 33 which is molded with a synthetic resin, such as acetal resin and ABS resin, which has a modulus of bending elasticity ranging from 200,000 to 1 million p.s.i. The aforesaid synthetic resins, when molded into articles, will usually have a Rockwell hardness scale R of the order of from 50 to 130. Said synthetic resins include those prepared by blending either acetal resin or ABS resin with other appropriate synthetic resin or resins, provided that the molded cap made with a mixture of these synthetic resins exhibits the aforesaid modulus of bending elasticity.

The base portion 34 of this stay 28 is provided with a tapered face 35, and further, it is provided, on the bottom face, with a protrusion 36 of a small size for determining the position of the stay. The platform member 32 which is adherently attached to the glass pane 31 may be made of a flat disc of, for example, a light alloy, and it is provided, on the side thereof away from the front glass pane to which the platform member is attached, with a recess 37 which is complementary in shape and size to detachably receive said small protrusion 36 therein. The platform member 32 is provided also with a thread 38 around the external side periphery thereof. The cap 33 is made of such a synthetic resin as the one described above, and is provided with an inner peripheral wall portion 40 having the formation of a thread in such a way that this cap 33 will serve as the female member relative to said platform member 32 and that this cap is adapted to be screwed onto the aforesaid thread of the platform member. This cap 33 is provided also with a tapered inner peripheral wall portion 41 which is formed adjacent to said threaded inner peripheral wall portion 40 by progressively reducing, therefrom, the inner diameter of said inner peripheral wall. This tapered inner wall face 41 of the cap 33 has an angle or inclination which is complementary for the inclination of the tapered upper face 35 of the base portion of the stay 28. Therefore, the fabrication of the whole device begins with securely and adherently attaching the platform member 32 to the rear or inside face of the front glass pane of the automobile, and then the tapered base portion 34 of the stay 28 is applied onto the exposed face of the platform member 32. Thereafter, the cap 33 is screwed progressively onto the platform member 32 from over the base portion of the stay, with the result that the tapered inner face 41 of the cap 33 will hold, thereinside, the tapered face 35 of the base portion of the stay 28 with an increasing tightness, and thus, the stay 28 will thereby be fixed to the predetermined position. When, however, the front face of the mirror is subjected to a substantial impact for any reason, there will be applied, to the stay 28, a force in the direction as shown by the arrow in FIG. 7. This force will then be transmitted therefrom to the cap 33 through the base portion 34 of the stay. Whereupon, the peripheral wall 40 of the cap 33 will develop an elastic deformation which will serve as a bumpering action. When, however, the amount of this elastic deformation or the bumpering action exceeds a certain limit or reaches close to the breaking point of the cap 33, there will take place a severe deformation of the cap and accordingly there will occur the disengagement of the peripheral wall 40 of the cap from the platform member 32 which is adherently and firmly attached to the front glass pane of the automobile, and as a consequence, the cap 33, jointly with the stay 28, will come off the platform member 32. Thus, when, in an accident or emergency, the head or other part of the body of the driver or the passenger runs into the mirror, the latter will, for the moment of such a collision, serve as the bumper to a certain extent. When, however, the energy of the collision surpasses this limit in the bumpering action of the mirror, the cap 33 will deform to such an extent as will detach from the platform member 32, and accordingly, the cap 33 will come off jointly with the stay 28 from the platform member 32 which will be retained firmly on the front glass pane 31. In this way, the head for example, of the driver or the passenger will receive, at the very moment of the collision against the mirror, an impact which is far less in intensity as compared with that which would otherwise be received by such portion of the body of the driver or the passenger. In addition, there will then be left nothing else on the front glass pane but the flat-faced platform member 32 alone after the mirror assembly, the stay and the cap have jointly come off therefrom. As will be understood easily, the arrangement of the stay and the platform in this example of the inside mirror assembly serves to minimize the danger that the driver or the passenger sustains an injury resulting from the collision of his or her head against the inside mirror.

Reference numeral 42 represents a projection which is formed on and extends outwardly from the surface of the base portion of the stay 28 in the region close to the termination of the tapered wall 41. Numeral 43 represents a cylindrical wall having a reduced thickness which is formed adjacent to and extends upwardly from the upper terminal edge of the tapered wall 41. Numeral 44 represents knurls formed on the inner face of said cylindrical wall 43. Numeral 45 represents spaced notches or cutouts formed in the wall of said cylindrical wall 43. These notches or cutouts will impart resiliency to the cylindrical wall portions 43 as the cap 33 is screwed onto the platform member 32. As this cap is screwed, it will work so as to fasten the base portion of the stay 28 to the platform member 32 with a progressively increasing tightness, in which case the projections 42 formed on the surface of the stay 28 will engage the knurls 44 of the cylindrical wall 43 of the cap 33, eventually producing a firm frictional engagement between the projections 42 and the cylindrical wall portions 43. Thus, the casual loosening of the cap from the platform member 32 and the base portion of the cap 33 is prevented.

The present invention has been described in connection with a preferred example. It should be understood, however, that the present invention is not limited only thereto, but many modifications and changes may be made by those skilled in the art without departing from the spirit of the present invention.

We claim:

1. An adjustable rear view mirror assembly for vehicles comprising in combination;

a casing formed from synthetic resin material and having an open front side, a mirror mounted in said open front side of said casing, said mirror having a first face having a high reflection factor and a second face having a low reflection factor, the planes of said faces intersecting each other at a predetermined angle, said casing having back and bottom wall portions said backwall portion having a generally centrally disposed aperture for receiving an articulated spherical member of a mounting bracket, said casing having an attachment fitting pivotally mounted therein adjacent said top wall for engaging said spherical member of said mounting bracket, said backwall of said casing having, approximate said bottom wall, at least one pair of generally horizontally disposed holding arms formed integrally with said backwall and spaced vertically from each other, said bottom wall having an aperture through which extends a reflection factor shifting rod, said rod being rotatably supported by said holding arms and provided at its end remote from said aperture with an eccentrically positioned lug, said other end of said shifting rod being disposed exteriorly of said casing, said attachment fitting having a bottom wall formed with an oblong slot for receiving said lug so that rotation of said rod will effect an angular displacement of said mirror casing about a generally horizontal axis with respect to said attachment fitting, the improvement comprising: said backwall of said casing having integrally formed therewith a pair of horizontally extending, resilient stopper arms having opposed faces extending in generally parallel, vertical planes, said stopper arms being disposed on opposite sides of said shifting rod, said rod having a mirror position regulating plate of polygonal cross section formed thereon with a plurality of pairs of parallel faces, said faces of each pair being on opposite sides of said plate so that said faces of said stopper arm will engage parallel pairs of faces of said plate to releasably restrain rotation of said rod.

2. An inside mirror assembly according to claim 1, wherein said attachment fitting is provided, substantially centrally of the vertical rear wall thereof, with an opening for insertion of the stem of an articulate spherical member and a seat formed around said opening for receiving said spherical member, said spherical member being nipped between a leaf spring fixed to said attachment fitting and said seat formed in said attachment fitting, the rear end portion of the stem of said articulate spherical member extending rearwardly through an aperture formed in the vertical rear wall of said mirror casing and being attached at its end, to a mounting bracket.

3. An inside mirror assembly according to claim 2, wherein said leaf spring has spaced lugs extending from the lowermost end edge thereof, said attachment fitting being provided with recesses in the body thereof for insertion of said lugs, said lugs of said leaf spring being inserted in said recessed, said leaf spring being fastened, at an upper site thereof, to said attachment fitting by a screw.

4. An inside mirror assembly according to claim 1, wherein said mirror is fitted in recessed grooves formed inside and along the peripheral edges of said open front of said mirror casing.

5. An inside mirror assembly according to claim 1, wherein said attachment fitting is provided, substantially centrally of the vertical rear wall thereof, with an opening for the insertion of the stem of an articulate spherical member therethrough and also provided, around and adjacent to said opening, with a seat for receiving said spherical member, said mirror position regulating plate being square in shape and being provided around the upper portion of said shifting rod, said stem of said articulate spherical member extending rearwardly through said opening of said attachment fitting, there being fixed a leaf spring to the attachment fitting to nip said spherical member between said leaf spring and said seat, there being attached, to the lowermost end of said shifting rod, a lever extending rearwardly and in perpendicular relation to said shifting rod, the free end of said stem of said articulate spherical member being coupled to one end of a mounting bracket which is fixed, at the other end, to the inside wall of the chamber in said vehicle.

6. An inside mirror assembly according to claim 1, wherein said attachment fitting is provided, substantially centrally of the vertical rear wall thereof, with an opening for the insertion of the stem of an articulate spherical member therethrough and also provided, around and adjacent to said opening, with a seat for receiving said spherical member, said mirror position regulating plate being square in shape and being provided around the upper portion of said shifting rod, said stem of said articulate spherical member extending rearwardly through said opening of said attachment fitting, there being fixed a leaf spring to the attachment fitting to nip said spherical member between said leaf spring and said seat, there being attached, to the lowermost end of said shifting rod, a lever extending rearwardly and in perpendicular relation to said shifting rod, the free end of said stem of said articulate spherical member being coupled to one end of a stay which has, at the other end, its base portion having a tapered surface, the flat end face of said base portion being applied to the flat top face of a disc-shaped platform member having its rear face securely attached to the inside face of the front glass pane of said vehicle, said disc-shaped platform member having a thread formed around its lateral periphery, said platform member and said base portion of said stay being mounted by a cap having a threaded inner wall portion and an adjacent tapered inner wall portion the inclination of the tapered wall of said cap being complementary to that of the tapered surface of said base portion of the stay, said cap being screwed onto said platform member whereby said base portion having the tapered surface is tightly fastened to said platform by the engagement of said tapered surface of said base portion and said tapered inner face of said cap.